United States Patent [19]
Doany et al.

[11] Patent Number: 5,921,650
[45] Date of Patent: Jul. 13, 1999

[54] HIGH EFFICIENCY FIELD-SEQUENTIAL COLOR PROJECTOR USING TWO SLMS

[75] Inventors: Fuad Elias Doany, Katonah; Alan Edward Rosenbluth, Yorktown Heights, both of N.Y.

[73] Assignee: International Business Machines Corporation, Armonk, N.Y.

[21] Appl. No.: 09/032,494

[22] Filed: Feb. 27, 1998

[51] Int. Cl.⁶ ................................................. G03B 21/14
[52] U.S. Cl. .............................. 353/31; 353/20; 353/84; 349/9; 348/743
[58] Field of Search .................................. 353/20, 31, 34, 353/37, 84; 349/9, 97, 106, 108, 109; 359/887, 891, 589, 884, 890, 464, 465; 348/743, 742, 268, 269, 270, 274

[56] References Cited

U.S. PATENT DOCUMENTS

| 3,597,069 | 8/1971 | Heinonen | 353/84 |
|---|---|---|---|
| 4,851,899 | 7/1989 | Yoshida et al. | 358/42 |
| 5,046,162 | 9/1991 | Ishikawa et al. | 358/42 |
| 5,371,543 | 12/1994 | Anderson | 348/743 |
| 5,463,433 | 10/1995 | Koo | 353/84 |
| 5,467,146 | 11/1995 | Huang et al. | 348/743 |
| 5,612,753 | 3/1997 | Poradish et al. | 348/743 |
| 5,774,196 | 6/1998 | Marshall | 348/743 |
| 5,777,694 | 7/1998 | Poaradish | 348/743 |

*Primary Examiner*—William Dowling
*Attorney, Agent, or Firm*—Scully, Scott, Murphy & Presser; David M. Shofi

[57] ABSTRACT

A display is disclosed operating in a field-sequential color mode having first and second light valves which are simultaneously illuminated with different color beams having different polarizations provided from a color wheel. The light valves provide an image forming light to a projection lens for projecting the image forming light onto a screen. The wheel has front and back surfaces which are displaced from each other and have segments of different colors for separating a polarized white light into the simultaneous different color beams. A retardation film for converting the polarization of colors reflected from the back surface from a first polarization to a second polarization. The wheel is rotated for sequentially illuminating the light valves with different colors of different polarizations simultaneously. The display further includes a polarizing beam splitter assembly for directing the different color light beams from the wheel to the light valves and directing the image forming light to the projection lens. The polarizing beam splitter assembly includes a plurality of polarizing beam splitter sub-assemblies. A clean-up polarizer for absorbing the first or second polarizations is located between two halves of the polarizing beam splitter assembly.

36 Claims, 12 Drawing Sheets

HIGH EFFICIENCY FIELD-SEQUENTIAL COLOR PROJECTOR USING TWO SLMS

RELATED APPLICATION

U.S. patent application Ser. No. 09/016,789, entitled "High Efficiency Two-SLM Projector Employing Total-Internal-Reflection Prism", filed on Jan. 30, 1998: and now U.S. Pat. No. 5,863,125, for Fuad DOANY is assigned to the assignee hereof and contains subject matter related to the subject matter of the present patent application. The content of the above-listed patent application is incorporated herein by reference.

BACKGROUND OF THE INVENTION

1. Field of the Invention

The present invention is directed to a projection display for sequentially illuminating and imaging at least two light valves or spatial light modulators (SLMs), and more particularly, to a high efficiency projector operating in a field-sequential color mode using polarization-based SLMs and employing a polarization-controlling prism assembly and a rotating wheel for simultaneously illuminating both light valves with different colors having different polarizations.

2. Discussion of the Prior Art

Typically, conventional projection displays have three light valves or spatial light modulators (SLMs). To reduce cost and complexity of projection displays, field-sequential color mode is used, where only one SLM is used to produce a full color image, instead of three SLMS, one for each of the primary colors, red (R), green (G), and blue (B).

In projection displays using the field-sequential color mode method, a full color image is produced using a single SLM by time-averaging the three primary colors. The single SLM is illuminated sequentially by the three RGB colors, one color at a time. For example, the single SLM is first configured with the red image data and exposed to red light for one-third of a frame time. Next, the single SLM is configured with the green image data and exposed to green light for the second third of the frame time. Finally, the single SLM is configured with the blue image data and exposed to blue light for the final third of the frame time. The full color image is the time average of three individual color sub-frames. This sequential illumination of the single SLM requires the SLM to operate at three times the illumination or update rate of each color. For example, if the full color frame is renewed at 60 Hz, then the SLM must operate at 180 Hz.

Although using only a single SLM, instead of three SLMs, reduces cost and complexity of displays, such conventional single SLM displays have several disadvantages. First, the SLM must operate at higher frequencies, typically three times the normal video frame rate. Second, conventional single SLM displays are relatively inefficient since only one color at a time is used, thus discarding ⅔ of the light from a white light source. The efficiency is actually worse than ⅓, since part of the frame time must be reserved for electronic data addressing and for a period of time required for SLM stabilization, referred to as dead-time. For example, because the response time of the liquid crystal (LC) material available for each color of the single SLM displays can be many milliseconds, this dead-time can become half, or more than half, the sub-frame time, which is ¹⁄₁₈₀ seconds (or 5.6 msec) for example.

As shown in FIG. 1, instead of a single SLM, a projection system 10 has two SLMs 12, 14 for enhancing the performance of the field-sequential color mode of operation. Such a projection display 10 using two SLMs is described in U.S. Pat. No. 5,517,340 to Doany et al., where enhancement is achieved by alternately illuminating the two SLMs 12, 14 using a color wheel 16. In this case, only one SLM is illuminated at a time. This allows a half-frame time to reset the data and the liquid crystal response, and stabilize each one of the two SLMS, thus eliminating the dead-time needed for conventional displays using a single SLM in the field-sequential color mode. Rather than operating at 180 Hz, the two SLMs operate at 90 Hz each to produce a 60 Hz combined image video rate. Each SLM still has a 50% dead time, however, the combined two SLM system 10 has no dead time, since one of the two SLMs 12, 14 is always illuminated. Although the two SLM configuration 10 eliminates the requirement of dead-time, the spectral efficiency is still only ⅓.

As shown in FIG. 1, a light source 18 provides white light to a polarizing beam splitter (PBS) cube 20. The PBS 20 has a coating that reflects one of the linear polarizations of light, such as the s-polarization, and transmits the other polarization, e.g., the p-polarization. The PBS cube 20 illuminates the two SLMs 12, 14 with light having different polarizations. For example, the PBS cube 20 illuminates one SLM 12 with s-polarized light and illuminates the other SLM 14 with p-polarized light. The PBS cube 20 recombines images reflected from the two SLMs 12, 14, to form a color image which is projected by a projection lens 22 onto a projection screen 24.

The two SLM projection display 10, which operates in the field-sequential color mode, has 50% duty cycle (or 50% ON-time and 50% OFF-time) for each SLM. FIG. 2 shows a timing diagram 100 of the conventional two SLM projection display 10 shown in FIG. 1. As shown in FIGS. 1 and 2, the color wheel 16 has six segments and rotates a full revolution in a time period 110 of ¹⁄₃₀ seconds (33.3 ms).

The six segments of the color wheel 16 include two red, green and blue (RGB) frames of alternating polarizations between successive colors, shown in FIGS. 1 and 2 as R-s, G-p, B-s, R-p, G-s and B-p, where s and p are the two linear polarizations of light, which are orthogonal to each other. The SLM 12 which receives the s-polarized colored light is shown as SLM-1 in FIG. 2, while the other SLM 14 which receives the p-polarized colored light is shown as SLM-2.

As shown in FIG. 2, the overall system cycles through an RGB frame twice in the 33.3 ms period 110, as the color wheel 16 rotates through its six segments, which correspond to two RGB frames. Thus, one full color frame is cycled every ¹⁄₆₀ seconds (16.67 ms), or at 60 Hz, shown as time period 115 in FIG. 2.

Instead of an 180 Hz SLM operation rate for a single SLM projector to provide a 60 Hz overall video rate, each SLM 12, 14 of the conventional two SLM projector 10 (FIG. 1) operates at only 90 Hz, despite an overall video rate or a full color image refresh rate of 60 Hz.

Each SLM 12, 14 has a refresh cycle time 120 of ¹⁄₉₀ seconds (11.1 ms), and is "ON" for ¹⁄₁₈₀ (5.556 ms) and "OFF" or "dead" for ¹⁄₁₈₀ (5.556 ms), shown in FIG. 2 as reference numeral 130. The two SLMs 12, 14 operate at opposite phase relationship, where one SLM is "ON" while the other SLM is "OFF".

Under proper conditions, (e.g., a low-voltage liquid crystal material, very small liquid crystal cell gaps, and using higher operating voltages), the liquid crystal (LC) response time can be reduced below 2 ms. The time allotted by the conventional two SLM projection device 10 is much longer than 2 ms, such as the 5.556 ms period 130, shown in FIG. 2. Thus, the conventional two SLM projector 10 of FIG. 1 is inefficient as it allows more OFF time then the required 2 ms LC response time.

Further, the conventional two SLM projector 10 of FIG. 1 illuminates only one SLM at a time. Thus, an average 50% duty cycle must be maintained and cannot be exceeded, which limits the efficiency of the conventional two SLM projector. Accordingly, there is a need for a full color projection display which is highly efficient.

SUMMARY OF THE INVENTION

The object of the present invention is to provide an optical device that eliminates the problems of conventional optical systems.

Another object of the present invention is to provide an optical device having increased efficiency and contrast ratio.

Yet another object of the present invention is to provide an optical device having a reduced OFF-time for increasing the duty cycle.

These and other objects of the present invention are achieved by a display operating in a field-sequential color mode having first and second light valves which are simultaneously illuminated with different color beams having having different polarizations provided from a color wheel. The light valves provide an image forming light to a projection lens for projecting the image forming light onto a screen.

In one embodiment, the wheel has front and back surfaces which have segments of different colors for separating a polarized light into the different color beams that simultaneously illuminate the two light valves. A retardation film for converting the polarization of colors reflected from the back surface from a first polarization to a second polarization. The wheel is rotated for sequentially illuminating the light valves with different colors of different polarizations simultaneously.

The display further includes a polarizing beam splitter assembly for directing the different color light beams from the wheel to the light valves. In addition, the polarizing beam splitter assembly directs the image forming light to the projection lens. The polarizing beam splitter assembly includes a plurality of polarizing beam splitter sub-assemblies, such as three or four sub-assemblies. In one embodiment, the polarizing beam splitter assembly also includes a clean-up polarizer for absorbing one of the first and second polarizations. The clean-up polarizer is located between two halves of the polarizing beam splitter assembly.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which.

DETAILED DESCRIPTION OF THE INVENTION

Figure 3:
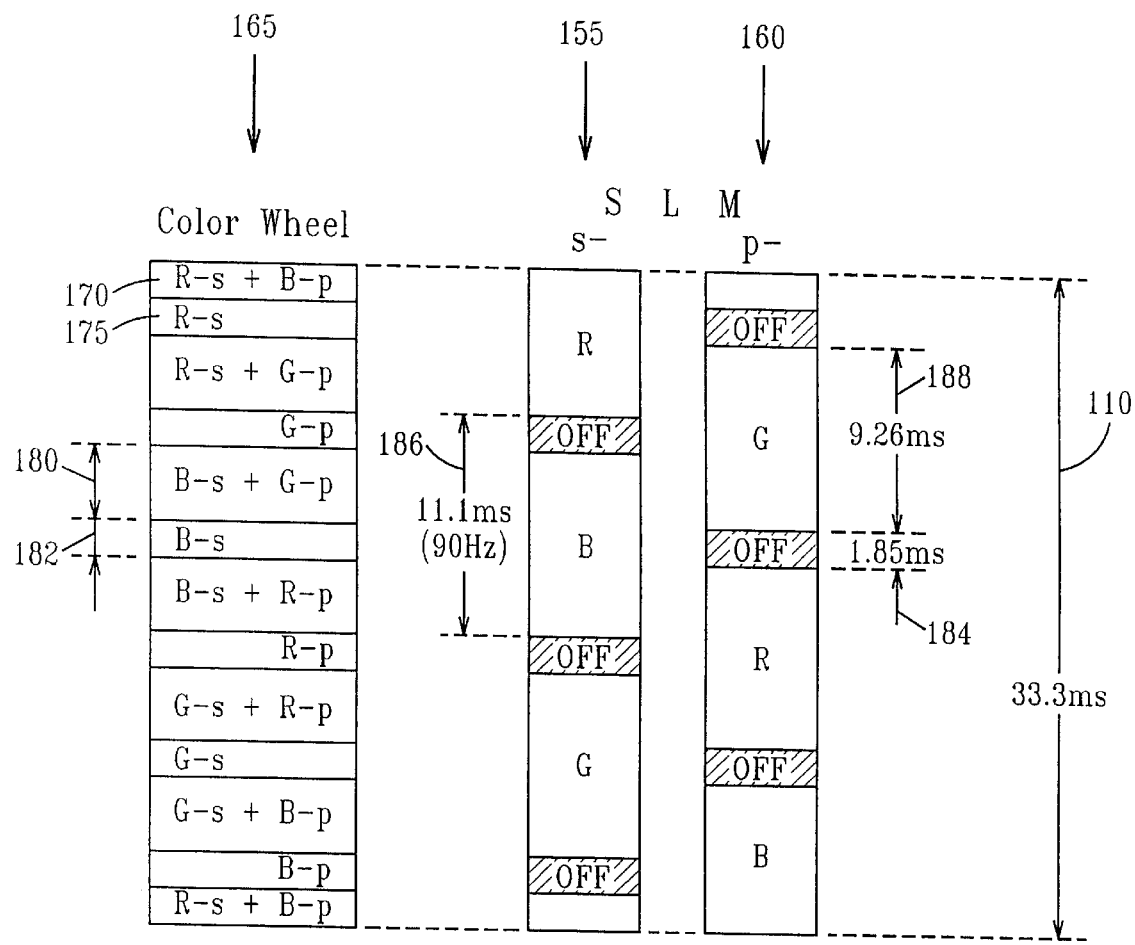
FIG. 3 shows a timing diagram of a projection display according to the present invention.

FIG. 3 shows a timing diagram of a projection display according to the present invention having two spatial light modulators (SLMs) or light valves and a color wheel, and operating in the field-sequential color mode to be described in detail in connection with FIGS. 4–18. As shown in FIG. 3, two fully shared SLMs 155, 160 are illuminated using a color and polarization sequence 165 provided by a color wheel 200 shown in FIG. 10, for example. The color and polarization sequence 165 has twelve illumination regions or segments which repeat as the color wheel 200 rotates.

Figure 1:
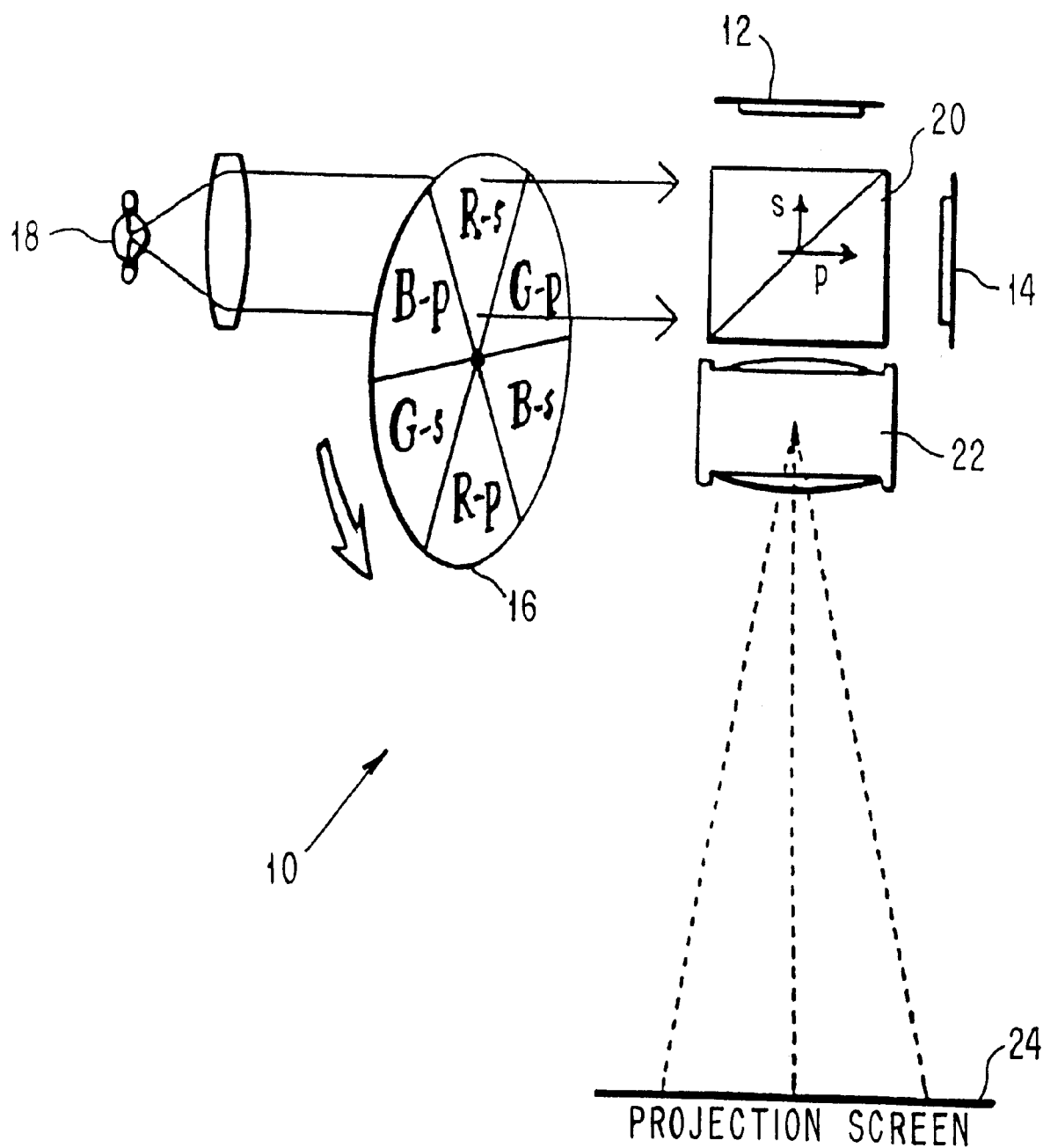
FIG. 1 shows a conventional projection display which operates in a field-sequential color mode and has two spatial light modulators (SLMs) and a color wheel.
Figure 2:
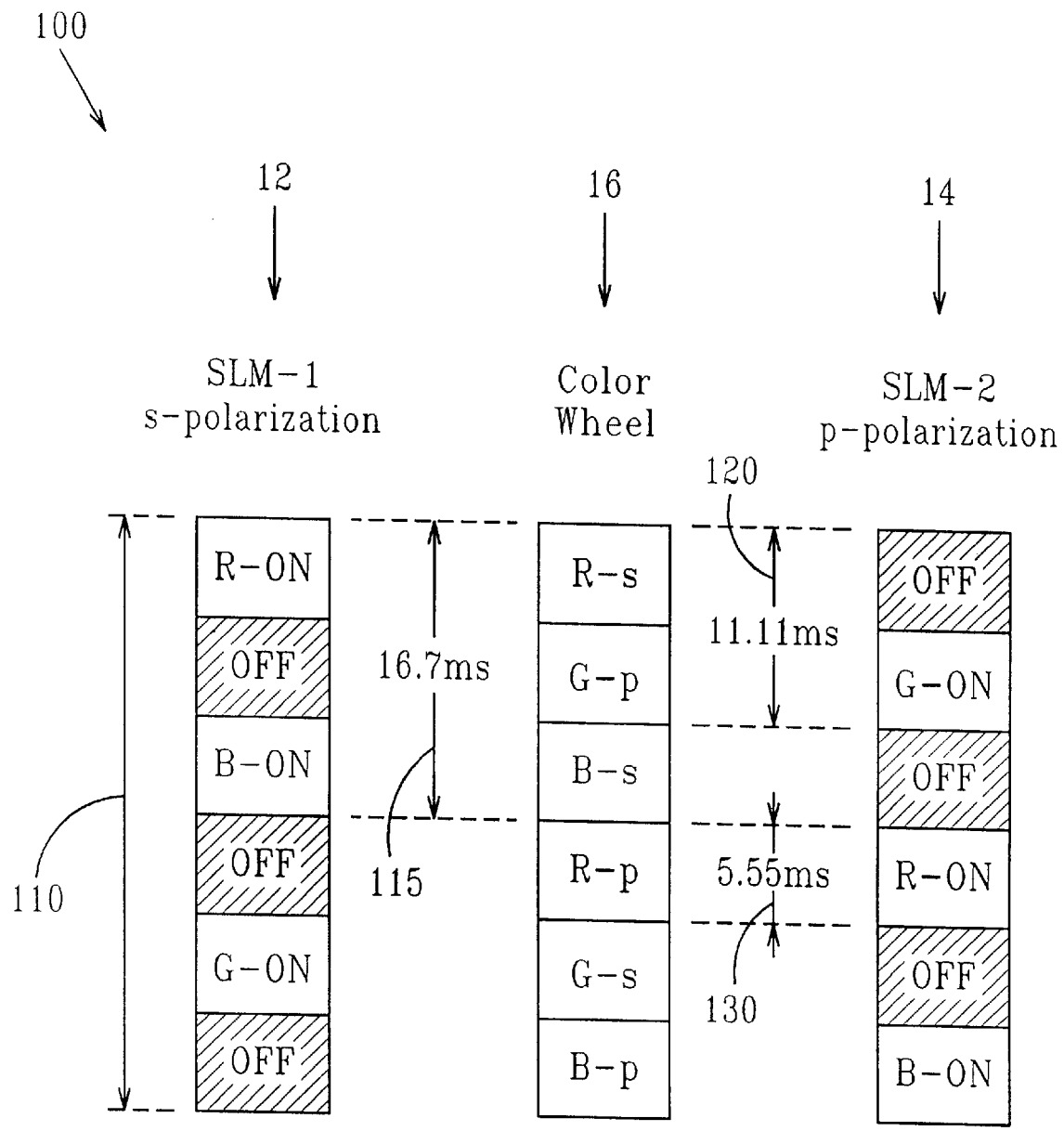
FIG. 2 shows a timing diagram of the conventional projection display shown in FIG. 1.

The color wheel 200 provides the illumination sequence 165 having alternating regions of dual and single color bands 170, 175. Thus, the color wheel 200 provides a dual color band 170 between each pair of single color bands 175. By contrast, each illumination segment of the conventional color wheel 16, shown in FIGS. 1 and 2, provides a single color output at any one time.

In the dual color bands 170, the selected two colors have perpendicular polarizations, for example, such as s-polarization and p-polarization, to permit subsequent separation of the two colors. As will be described, the subsequent color separation is required to direct each color to its own SLM, where the SLM receiving s-polarized illumination is referred to as the s-SLM 155, and the SLM receiving p-polarized illumination is referred to as the p-SLM 160.

As depicted in FIG. 3, the color wheel provides illumination in the following repeating illumination sequence: R-s+B-p; R-s; R-2+G-p; G-p; B-s+G-p; B-S; B-s+R-p; R-p; G-s+R-p; G-s; G-s+B-p; and B-p. The final band R-s+B-p includes the same two colors and associated polarizations as the first band, where the entire sequence 165 is repeated.

The time-overlapping dual color bands 170 increase the duty cycle illumination onto each SLM to greater than 50% duty cycle for each SLM 155, 160. Illustratively, the full color image refresh rate is 60 Hz, where each RGB frame is cycled in ⅟60 seconds (16.7 ms). The time duration 180 of the dual color bands 170, e.g., 3.705 ms, is twice the time duration 182 of the single color bands 175, e.g., 1.85 ms, which is the duration of the OFF time 184 of each SLM 155, 160.

As shown in FIG. 3, two full RGB frames are cycled in a time period 110 of ⅟30 seconds (33.3 ms), and each SLM 155, 160 operates at 90 Hz, for an operating period 186 of 1/90 seconds (11.11 ms) which is the same as the operating period of the conventional color wheel 16 shown in FIG. 2. However, unlike FIG. 2 where the duty cycle cannot exceed 50%, the 11.11 ms cycle operating time period 186 of each SLM 155, 160 shown in FIG. 3 includes an ON period 188 of 9.26 ms (compared to the ON period 130 of 5.556 ms in FIG. 1) and the OFF period 184 of 1.85, thus resulting in a duty cycle of 83.4% (9.26/11.1=0.834). Thus, by comparison to the conventional 2-SLM optical system shown in FIGS. 1 and 2, the 2-SLM optical system using the color and polarization sequence 165 of FIG. 3 provides a greater than 1.6 times increase in efficiency; from a maximum of 50% for the conventional 2-SLM optical system of FIGS. 1 and 2, to the greater than 83% for the 2-SLM optical system using the color and polarization sequence 165 of FIG. 3.

Conventional color wheels, such as the conventional color wheel 16 shown in FIGS. 1 and 2, operate in transmission and do not permit selection of two independent colors with perpendicular polarization states. Illustratively, a reflective color wheel is used to achieve the desired color control depicted in FIG. 3, where both SLMs 155, 160 are simultaneously illuminated using two different colors having perpendicular polarizations through the dual color bands 170. Using such a reflective color wheel, both surfaces of the wheel can be used to control the output color selection.

FIGS. 4–10 show a preferred embodiment of a reflective color wheel 200. (FIG. 10) which is used with a polarized illumination source. The reflective color wheel 200 has two surfaces 205, 210. In this embodiment, the front surface substrate 205, which is nearest a light source, has a dichroic coating to reflect one color, while the rear surface or substrate 210 has a dichroic coating to reflect the second color. The third color is transmitted through both surfaces 205, 210 of the wheel 200, which rotates around a center axis 215 using a motor 220, for example, shown in FIG. 13.

Figure 9:
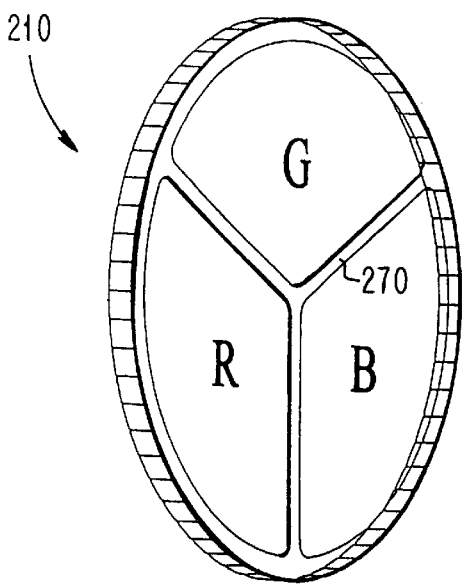
Figure 10:
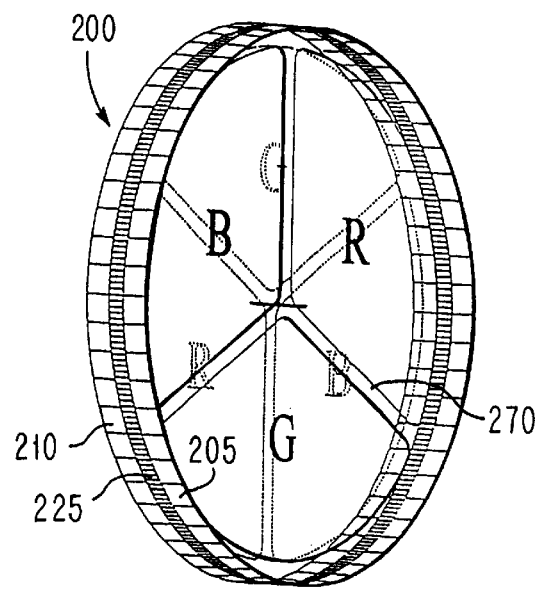

FIGS. 4, 7 and 6, 9 show filter layouts on the front and back substrates 205, 210 of the color wheel 200 shown in FIG. 10 that accomplish the color and polarization division sequence 165 (FIG. 3). The letter labels, i.e., R, G, B shown in the figures indicate the color reflected by each filter. As shown in FIGS. 4, 6, 7, 9 and 10, the front and back substrates 205, 210 have equal regions of RGB filters, each color filter occupying as much as 1/3 the area of the front and back substrates 205, 210, or a portion smaller than 1/3 in the ratio of the light valve ON-time to OFF-time. Each of the RGB color regions of the front substrate 205 are offset by 180° from the respective RGB color filters of the back substrate 210. However, it is understood that other layouts are possible, for example incorporating an increased number of filter segments.

Figure 5:
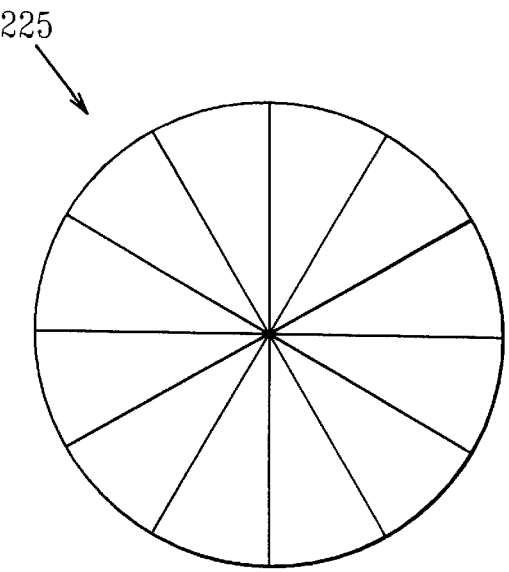
Figure 8:
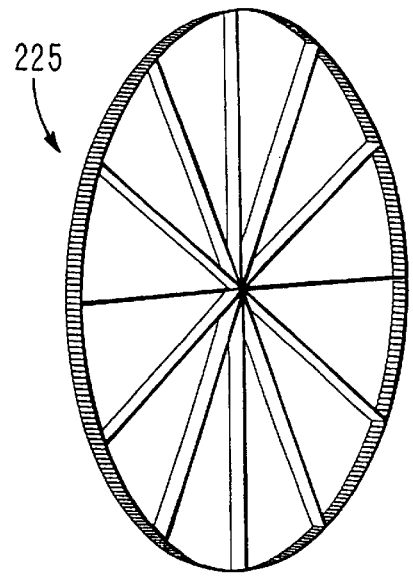

FIGS. 5 and 8 show an optical retardation film 225, which is segmented for example, and is placed between the front and rear filter coatings 205, 210. This retardation film 225 causes light reflected from the rear surface filters to have opposite polarization from the light that reflects from the front surface filters. Because light reflects from the two surfaces 205, 210 in opposite polarizations, each surface can be made to address a different light valve as described below. FIG. 10 shows a perspective view of the composite color wheel 200, having optical retardation film 225 sandwiched between the front and rear filter coatings 205, 210.

The substrate of the front and rear surfaces or dichroic reflectors 205, 210 of the composite color wheel 200 is made of transparent material, for example, having reflective coatings deposited on the inner surfaces of the front and rear substrates which face the retardation film 225.

Figure 4:
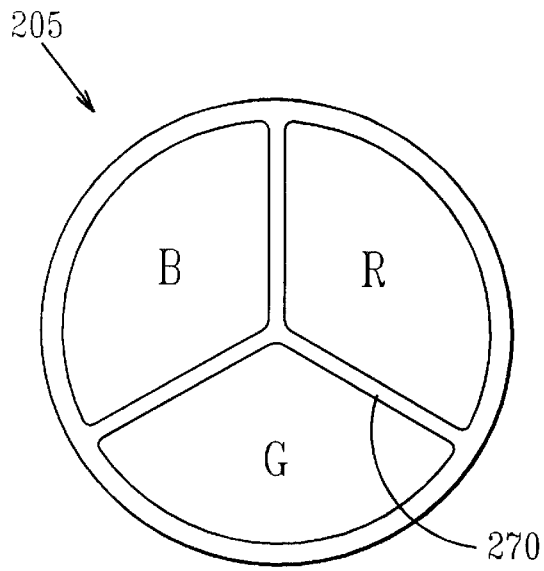
FIGS. 4–10 show a composite color wheel along with its front, rear and middle sections according to the present invention.
Figure 6:
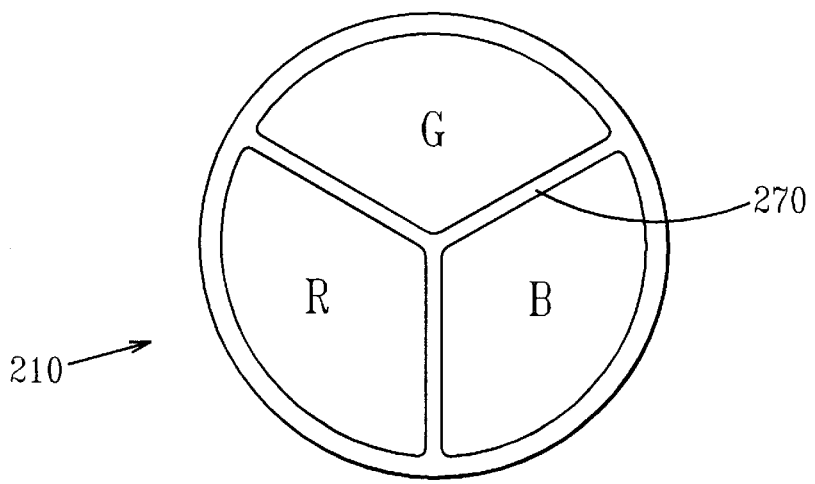
Figure 7:
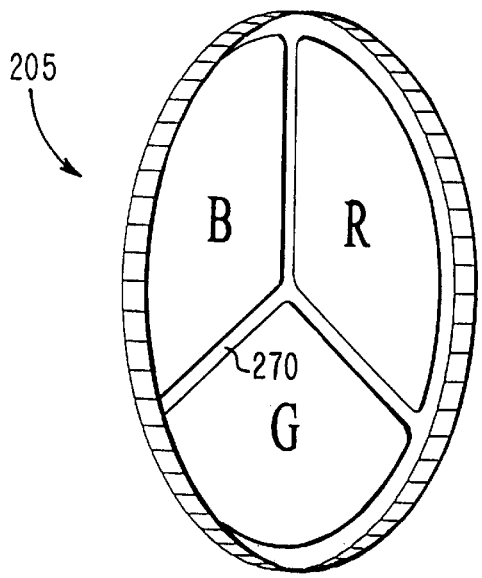

FIGS. 7–9 are perspective views of FIG. 4 (front dichroic surface 205), FIG. 5 (segmented optical retardation film 225) and FIG. 6 (rear dichroic surface 210), respectively. The whole color wheel 200 is the composite of the front surface dichroic reflector 205, the segmented optical retardation film 225, and the rear surface dichroic reflector 210. FIG. 10 shows a perspective view of the color wheel 200 as a whole, with the filter coatings of the front substrate 205 shown as solid lines, and those of the rear substrate 210 shown as dashed lines.

In addition to the color selection property provided by the filter coatings of the front and rear surfaces 205, 210, the wheel 200 also incorporates polarization control using the optical retardation film 225. By placing a quarter-wave ($\lambda/4$)retardation film 225 between the two dichroic coating 205, 210, a net half-wave retardation, or 90-degree rotation of polarization is induced into the color reflected off the second (rear) surface 210 of the wheel 200. In particular, the 90 degree rotation is due to the color ray traveling through the $\lambda/4$ retardation film 225 twice; first passing through the first or front surface 205 and the $\lambda/4$ retardation film 225 toward second or rear surface 210, and next reflecting from the rear surface 210 and passing for the second time through the $\lambda/4$ retardation film 225 to emerge from the front surface 205. The $\lambda/4$ retardation film 225 is segmented, so that one of the retardation axes in each segment is approximately aligned with the radius of the color wheel 200. The final outcome is that the light reflected from the two surfaces 205, 210 of the color wheel 200 is two colors having orthogonal polarization states.

In summary, light reflected from the color wheel 200 has two colors and orthogonal polarization states. Thus, the color wheel 200 separates polarized white light impinging on the front surface 205 into different colors and orthogonal polarizations. In particular, a first color having a first polarization reflects from the front surface 205, and a second color having a second polarization emerges from the front surface 205 after being reflected from the rear surface 210 and passing twice through the $\lambda/4$ retardation film 225 to undergo the 90° polarization rotation as described above.

As described above, the rotating color wheel 200 provides the repeating color and polarization sequence 165 shown in FIG. 3, where two light beams having different colors and polarizations are reflected simultaneously from the front and rear surfaces 205, 210 during the dual bands 170.

In this illustrative configuration of the color wheel 200, where the color sequence 165 of FIG. 3 is achieved, the two reflected colors are utilized for illuminated the two SLMs 155, 160, while the third transmitted color is discarded. However, since the reflective color wheel 200 separates all three colors, other optical systems may use the transmitted color along with one of the reflected colors.

As described, the function of the color wheel 200 is to provide two simultaneous colors during the dual color bands 170 shown in FIG. 3, where the two different colors have perpendicular polarization states. In addition, the color wheel 200 independently cycles through the three colors for both light outputs reflected from the two surfaces 205, 210, respectively, used to illuminate the two SLMs 155, 160.

Figures 11, 12:
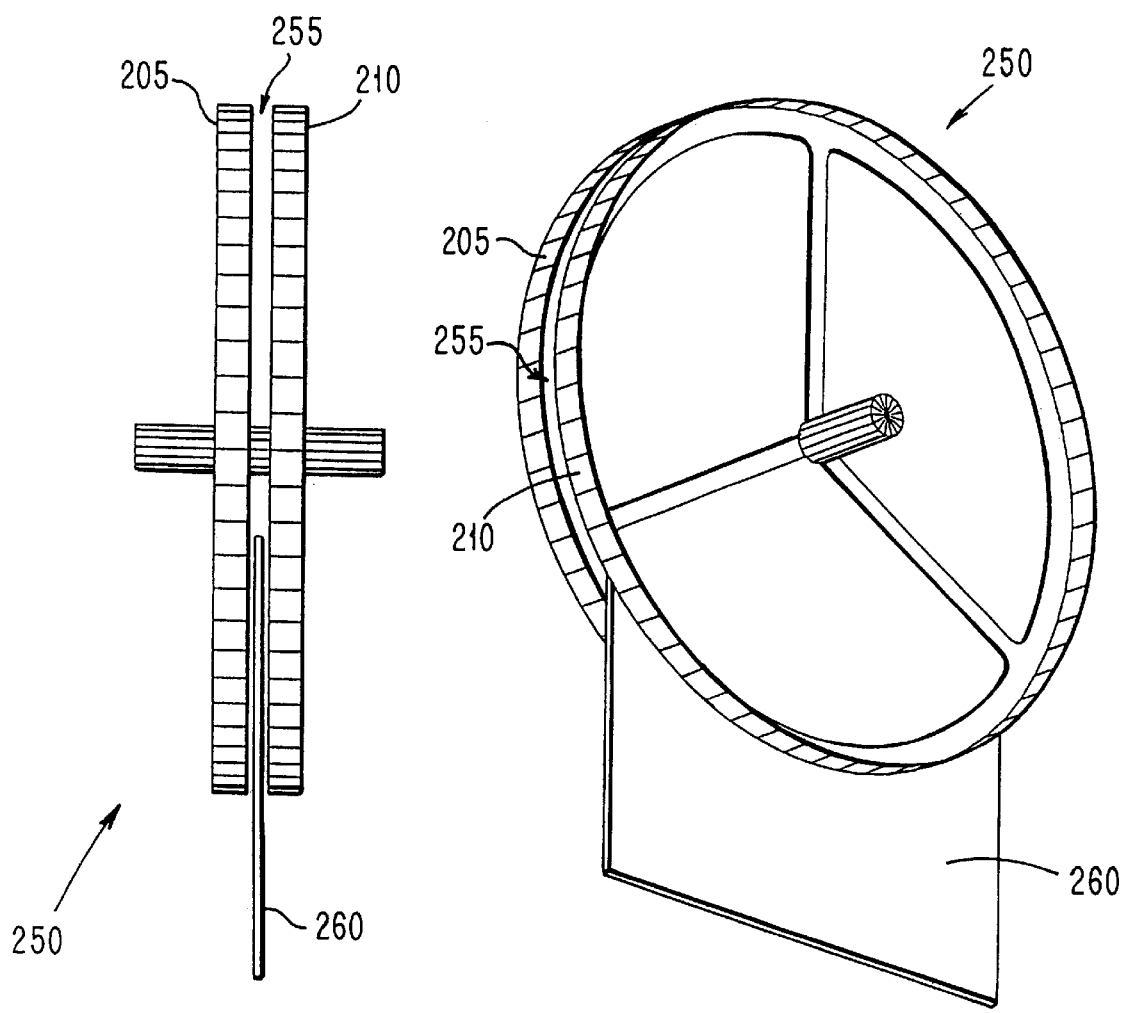
FIGS. 11–12 show another embodiment of a color wheel according to the present invention.

Although FIGS. 4–10 show one configuration for the reflective color wheel 200, several other configurations incorporating two reflective surfaces and optical retardation films can provide the desired function. FIGS. 11 and 12 show another illustrative embodiment of a color wheel 250. In FIGS. 11 and 12, the front and rear wheel reflective surfaces 205, 210 are physically separated with an air gap 255 therebetween. This allows the ability to include a static quarter-wave retardation film 260, which does not rotate with rotation of the wheel 250. The static quarter-wave retardation film 260 is fixed in the air gap 255 between the front and rear wheel segments 205, 210 while the wheel rotates.

The reflective color wheel is used in a projector using a polarized white light illumination system, such as those employing arc lamps and polarization conversion illumination optics. The polarized illumination is then directed to the color wheel. As the color wheel rotates, the light reflected off the first or front surface of the wheel cycles through the three color bands and has the same polarization as the incoming light polarization. Meanwhile, the light reflected from the second or rear surface cycles through the three color bands at the perpendicular polarization.

The color selection and relative timing between the front and rear surfaces are independent, as long as the two surfaces do not select the same color at the same time. Between the reflective dichroic regions or segments of the color wheel, each surface also includes completely transparent regions 270 (FIG. 10).

In these transparent regions 270, no light is reflected off the surfaces thus providing the necessary dead-time or "OFF" time 184 (FIG. 3) between two consecutive color bands. The duty cycle of the reflected light is therefore determined from the relative "ON" time 188 (FIG. 3) of the reflective coating to the "OFF" time 184 (FIG. 3) of the totally transmitting regions 270 (FIG. 10) of the wheel surface. As described in connection with FIG. 3, the duty cycle of each SLM is greater than 50%, such as 83.4%, for example.

Figure 13:
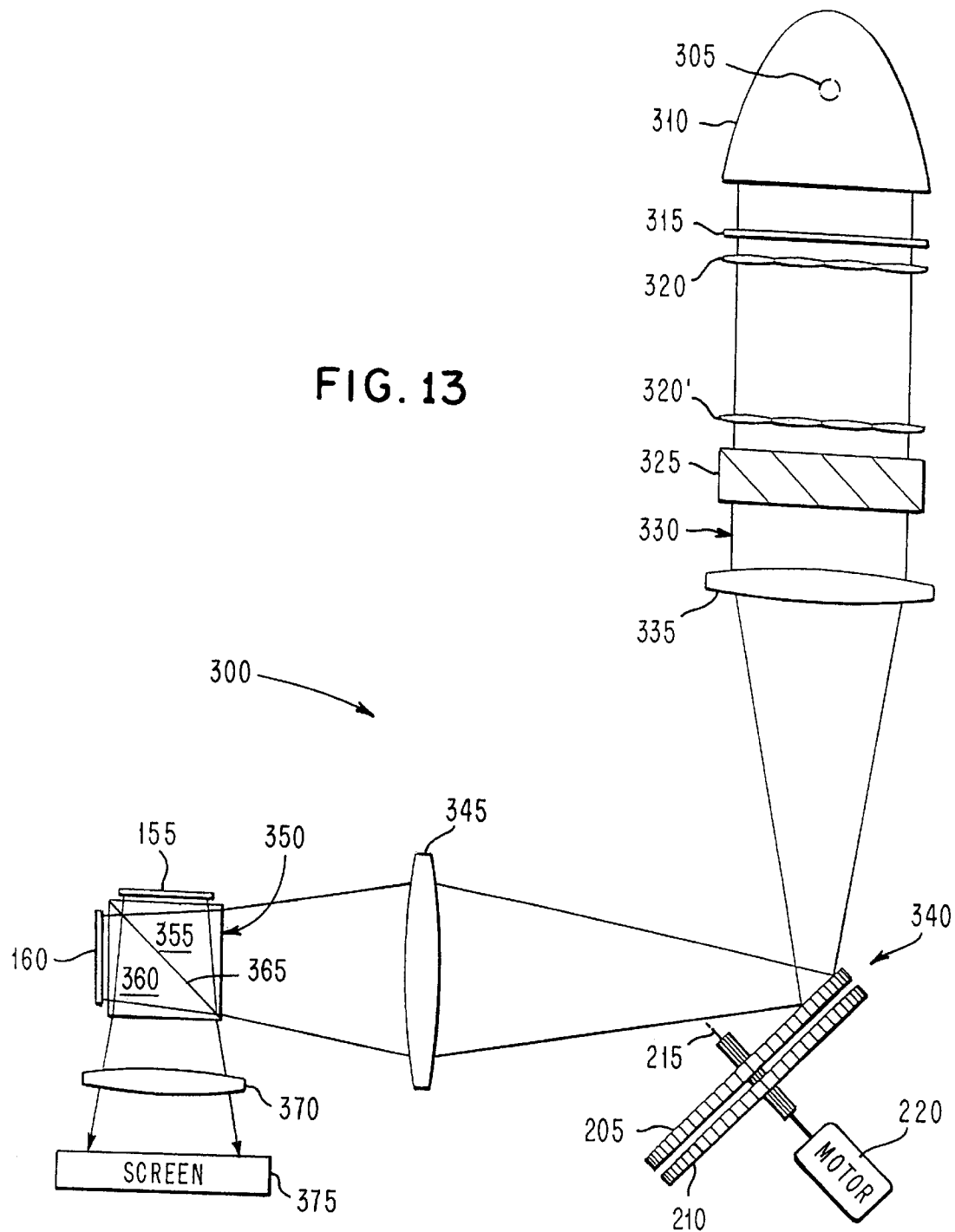
FIG. 13 shows a projection system based on reflective SLMs according to the present invention.

FIG. 13 shows a complete projection system 300 based on reflective SLMS, however transmissive SLMs may be used instead of reflective SLMs. As shown in FIG. 13, light from an arc-lamp 305 encased in a parabolic reflector 310 is first filtered to discard ultraviolet and infrared radiation using ultraviolet and infrared filter or filters, shown collectively in FIG. 13 as reference numeral 315.

The filtered light then passes through a fly's eye integrator 320, 320' and polarization conversion system (PCS) 325 to produce polarized light 330 of uniform intensity. A condenser lens 335 images the plane of uniform light intensity onto a color wheel 340, which is one of the color wheels 200, 250 shown in FIGS. 10–12.

As described above, the two surfaces 205, 210 of the color wheel 340 reflect the incident light to illuminate the two SLMs 155, 160. The color wheel 340 rotates around a transverse axis 215 passing through its center to separate the incident polarized white into different colors having different polarization. In particular, the rotating color wheel 340 provides the repeating color sequence 165 shown in FIG. 3, where in the dual bands 170, two colors having perpendicular polarization are simultaneously provided.

At least one illumination relay lens 345 is used to image the uniform illumination plane, reflected from the color wheel 340 onto the two SLMs, namely, the p-SLM 160 and the s-SLM 155, through a polarizing beam splitter (PBS) cube 350. The PBS cube 350 separates the two colors of perpendicular polarizations and directs each to its respective SLM. In particular, the PBS cube 350 is made of two prisms 355, 360 with an interface 365 therebetween. The interface 365 has a coating which allows one polarization of light, e.g., the p-polarization, to pass through and illuminate the p-SLM 160, and reflects another polarization of light, e.g., the s-polarization, to illuminate the s-SLM 155.

Specifically, the two SLMs 155, 160 are placed near two adjacent surfaces of the PBS 350 such that one SLM is illuminated in transmission, e.g., the p-SLM 160, and the other SLM, e.g., the s-SLM 160, is illuminated in reflection off the PBS interface 365.

Each SLM 155, 160 selectively rotates the incident light to form and reflect an image forming light. For the dark pixels, the light reflected by each SLM is of the same polarization and is directed back toward the illumination system. For bright pixels, the reflected light with rotated polarization is directed by the PBS coating toward a projection lens 370, which then images the SLMs onto a screen 375.

Although the simple projection optical system 300 depicted in FIG. 13 is adequate in principle, the performance in practice is limited. In particular, the resulting contrast ratio may be poor. In order to achieve greater than 100:1 contrast ratio, the PBS coating 365 of the projection system 300 must operate efficiently in reflecting more than 99% of the s-polarized light and transmitting more than 99% of the p-polarized light over the entire visible spectrum and over a reasonable range of illumination angles (e.g. ±10 degrees). However, presently available optical coating performance is not adequate to achieve these goals. Although greater than 99% s-reflection is possible, much greater than 90% p-transmission at large angles (on the order of 10 degrees) is difficult.

Typical optical systems using reflective SLMs and PBSS must include an absorbing clean-up sheet polarizer film in the reflection path of the PBS to ensure adequate contrast ratio performance. In the 2-SLM projection optical system 300 shown in FIG. 13, both polarizations are used simultaneously in the dual bands 170 shown in FIG. 3. Therefore, it is not possible to include a clean-up polarizer.

Figure 14:
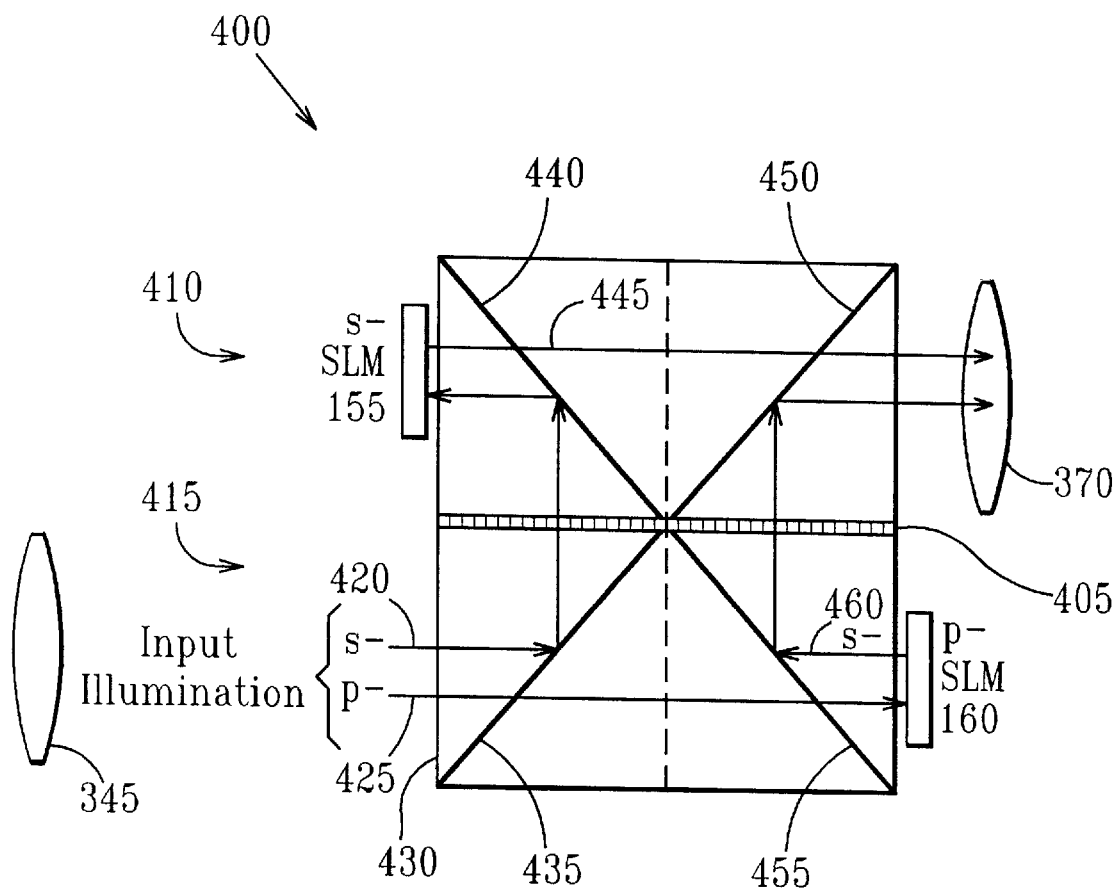
FIG. 14 shows a polarizing beam splitter (PBS) X-cube having four PBS sub-cubes according to the present invention.

FIG. 14 shows a PBS X-cube 400 which is used to provide a greater than 100:1 contrast ratio and is compatible with the reflective color wheel 340 shown in FIG. 13. The PBS X-cube 400 is equivalent to four small PBS sub-cubes and has a cleanup sheet polarizer 405 located between upper and lower pairs of PBS sub-cubes. One SLM, e.g., the s-SLM 155, and the projection lens 370 are located at opposite sides of the upper pair 410 of the PBS sub-cubes. The other SLM, e.g., the p-SLM 160, and the illumination relay lens 345 are located at opposite sides of the lower pair 415 of the PBS sub-cubes. As shown in FIG. 14, the s-SLM 155 and the illumination relay lens 345 are located on a first side of the PBS X-cube 400, while the p-SLM 160 and projection lens 370 are located on a second side of the PBS X-cube 400 opposite the first side.

The s-polarized 420 and p-polarized 425 illumination color bands are introduced into one side 430 of the first sub-cube, which side is opposite the side where the p-SLM 160 is located. The s-polarized light 420 is reflected by the first PBS coating 435 and is directed to the second PBS sub-cube.

After passing through the cleanup sheet polarizer 405, the light is reflected off the second PBS coating 440 and is directed to the s-SLM 155. The absorbing clean-up polarizer 405 absorbs p-polarization, for example, and ensures that none of the p-polarized light will impinge onto the s-SLM 155. The s-SLM 155 selectively rotates the s-polarized light to form a p-polarized image forming light 445. The polarization rotated image forming (p-polarized) light 445 reflected by the s-SLM 155 passes through the second PBS coating 440, as well as through the fourth PBS coating 450, and emerges toward the projection lens 370.

Meanwhile, the p-polarized input illumination color band 425 from the color wheel 340 (FIG. 13) passes through the first and third PBS coatings 455 to impinge onto the p-SLM 160. An image forming light of s-polarization 460, which is selectively rotated and reflected from the p-SLM 160, is reflected by the third PBS coating 445 and is directed to the fourth PBS coating 450. After passing through the clean-up polarizer sheet 405, the s-polarized image forming light 460 is reflected by the fourth PBS coating 450 and is directed to the projection lens 370. The absorbing clean-up polarizer 405 ensures that no dark state p-polarized light is directed toward the projection lens 370.

The use of the absorbing clean-up polarizer film 405 in the reflection path of the image-forming PBS X-cube 400 ensures high contrast ratio performance. Although the PBS X-cube is functionally equivalent to 4 PBS sub-cubes as described above, opto-mechanically it is comprised of two identical prism assemblies, namely the upper and lower prisms 410, 415. The complete assembly incorporates the s-transmitting film polarizer 405 between the two halves 410, 415.

Figure 15:
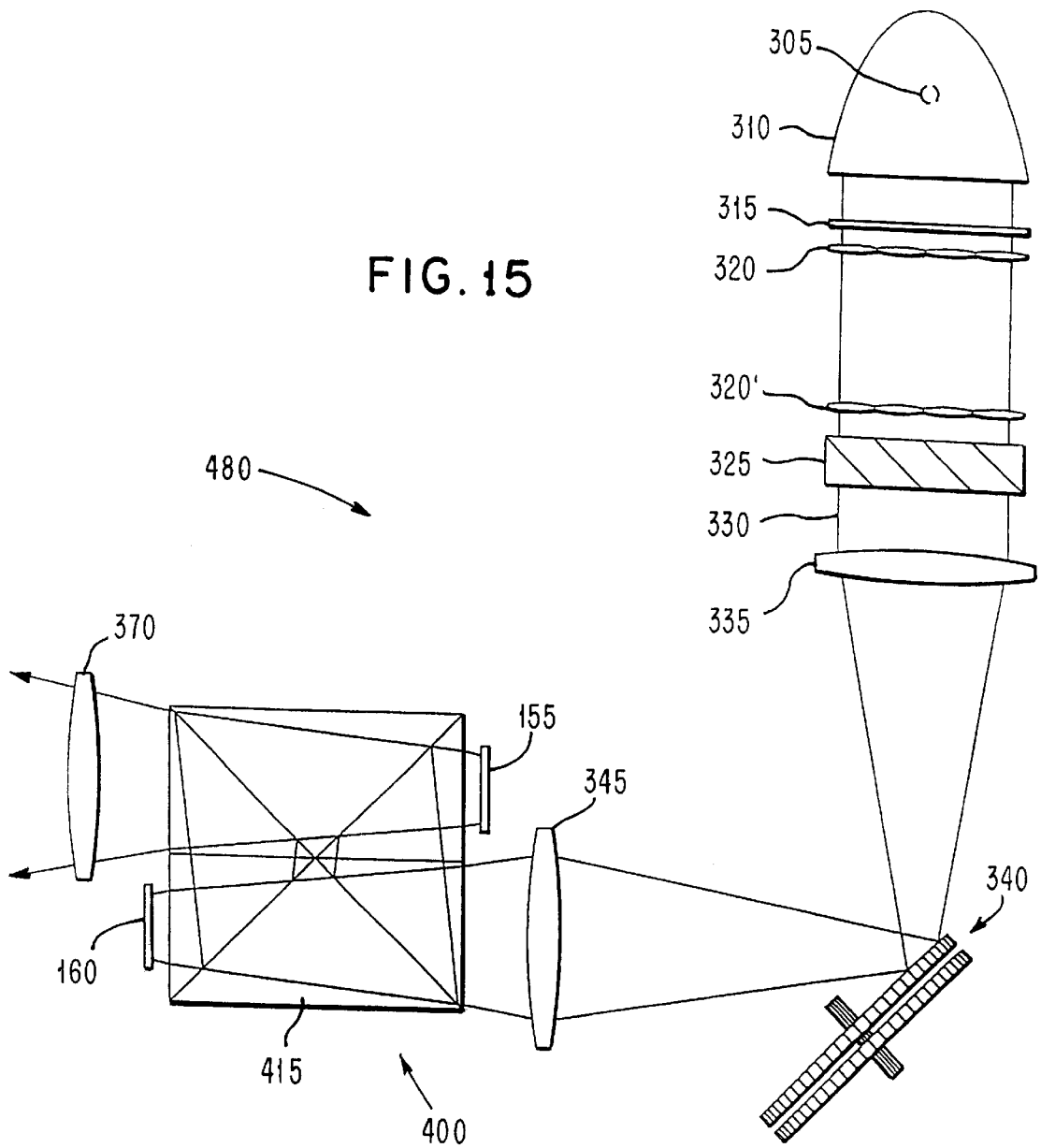
FIG. 15 shows a projection system based on reflective SLMs according to a preferred embodiment of the present invention.

FIG. 15 shows a complete optical system 480 of the preferred embodiment of the present invention. The illumination begins with the arc lamp white light source 305 encased in the parabolic reflector 310. Following the UV-IR filter(s) 315, the visible light is directed through the fly's eye integrator 320, 320' and polarization conversion optics 325 to produce the uniform intensity polarized illumination 330.

The polarized uniform light 330 is imaged by the condenser lens 335 onto the reflective color wheel 340 which is oriented at some angle other than normal to the light path, such as 45 degrees. The wheel 340 simultaneously reflects two color bands of perpendicular polarization and directs the light toward the PBS X-cube assembly 400. The illumination relay lens 345 is used to provide imaging of the color wheel uniform intensity plane onto the p-SLM 160 and the s-SLM 155.

As described in connection with FIG. 14, the illumination relay lens 345 illuminates the lower prisms 415 of the PBS X-cube 400. The PBS X-cube 400 provides the proper polarization control to direct the s-polarized light to the s-SLM 155 and the p-polarized light to the p-SLM 160. The PBS X-cube 400 also combines the image forming light from both SLMs 155, 160 and directs it to the projection lens 370.

Figure 16:
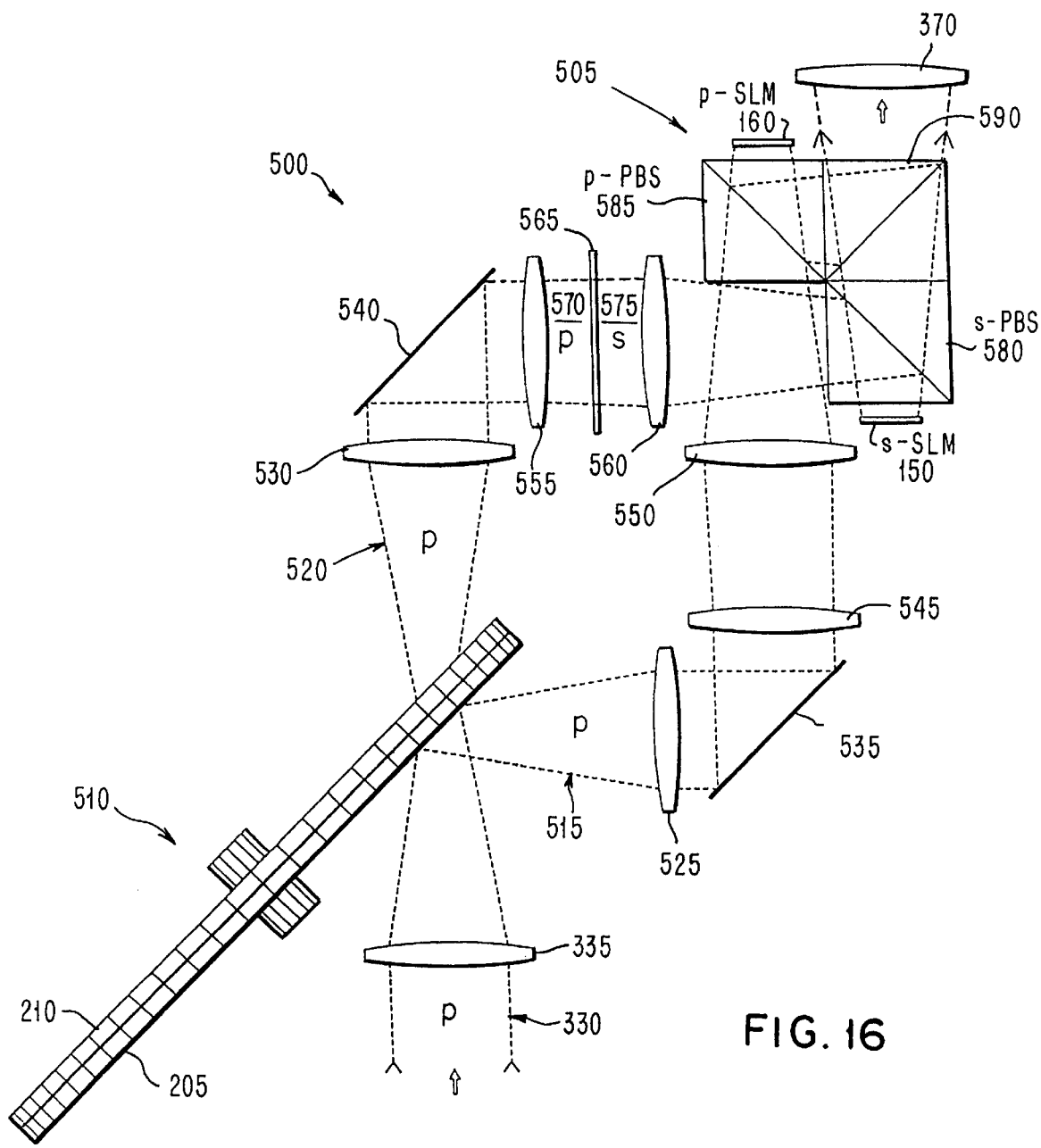
FIG. 16 shows a projection system based on reflective SLMs according to another embodiment of the present invention.

FIG. 16 shows another embodiment of an optical system 500 using a multiple PBS cube 505. Rather than the 4-cube system, i.e. the PBS X-cube 400 depicted in FIGS. 14, 15, the multiple PBS cube 505 is equivalent to 3 PBS sub-cubes. In this optical system 500, another dual-surface color wheel 510 is used to provide the two independent colors in two different directions, as opposed to a single direction of the color wheel 340 described in connection with FIGS. 13 and 15. The color wheel 510 filters light by reflection from the front surface 205. In addition, instead of a reflection from the second or rear surface 210, light is filtered by absorption in the rear surface 210. This is achieved by having reflective filter coatings on the front surface 205 and absorptive filter coatings on the rear surface 210.

As shown in FIG. 16, one color is selected by reflection and the second color is selected by transmission through the dual-surfaces 205, 210 of the color wheel 510. For example, p-polarized uniform light 330 is imaged by the condenser lens 335 onto the reflective color wheel 510 which is oriented at some angle other than normal to the light path, such as 45 degrees. The dual-surface color wheel 510 simultaneously reflects one color 515 and transmits a different color 520 of the same polarization, which is the p-polarization in this illustrative example.

The two different color lights 515, 520 pass through a respective relay lens 525, 530 to reflect through a respective mirror 535, 540 toward the respective SLMs 160, 155. Illustratively, a two relay lenses 545, 550 direct one color light toward the p-SLM 160 and two other relay lenses 555, 560 direct the other color light toward the s-SLM 155.

The color wheel 510 of the optical system 500 need not provide the half-wave retardation function. Thus, an optical retardation film is not needed between the two surfaces 205, 210 of the color wheel 510. This is in contrast to the optical wheel 340 (FIGS. 13, 15), which includes a quarter wave plate 225 (FIGS. 5, 8, 10) or 260 (FIGS. 11, 12) between the two surfaces 205, 210 as described in connection with FIGS. 5, 8 and 10–12, Since the two illumination paths of different colors are separated, a half-wave ($\lambda/2$) retardation film 565 can be placed in one of the illumination paths. Illustratively, the $\lambda/2$ retardation film 565 is placed between the two relay lenses 555, 560 which direct the light toward the s-SLM 155. The $\lambda/2$ retardation film 565 converts the p-polarized light 570 incident thereon to s-polarized light 575.

The s-polarized and p-polarized illumination sources are directed separately to the two SLMs 155, 160. Each SLM 155, 160 is illuminated and analyzed by its own PBS, namely, an s-PBS 580 and a p-PBS 585, while the third PBS 590 is a combining PBS used to combine the light from the two SLMs 155, 160. As in the optical system 480 shown in FIG. 15 using the PBS X-cube 400, the optical system 500 PBS X-cube 500 of FIG. 16 also allows high contrast ratio performance for the 2-SLM system.

As depicted in FIGS. 15 and 16, the optical systems 480, 500 combine the images of two independent SLMs 155, 160 operating at perpendicular polarization. Each SLM 155, 160 provides a full color image with a high contrast ratio. Without any additional modifications, these optical configurations 480, 500 provide 3-dimensional (3-D) projection capability. Like many 3-D projectors, these configurations 480, 500 provide a "left" eye image and a "right" eye image of perpendicular polarizations. The left and right images are independently analyzed using polarizers at the viewer's eyes. Since each SLM functions independently, the left image data can be sent to the first SLM and the right image data sent to the second SLM.

In all embodiments of the field-sequential 2-SLM systems described above, it was assumed that both SLMs will cycle through all three color bands. However, some applications require one SLM to operate at one fixed color, while the second SLM cycles through the other two color bands. The dual-surface reflective color wheel can also be used for these applications. In such cases, the front surface 205 of the color wheel is simply a single color reflection coating, such as a red reflector, instead of the tri-color reflection coating shown in FIGS. 4, 7.

Once the first color (e.g., red) is separated, its polarization is rotated by 90 degrees using a half-wave retardation film and is directed to the PBS optics using a dichroic beam combiner. Meanwhile, the rear surface of the color wheel is used to alternately select green and blue illuminations. The green or blue light is combined with the red light in the beam combiner and is also directed to the PBS optics.

Another embodiment separates the functions of the front and rear surface of the color wheel. This is possible in the case where one SLM is dedicated to one color, while the second SLM cycles through the other two colors. For example, a red dichroic reflector can be used to first separate the red light from the polarized illumination, while transmitting the green and blue light. The color wheel is then used to simply alternate between the green and blue light, with the appropriate dead-band between the alternating colors. The polarization of the red light is then rotated by 90 degrees. A dichroic beam combiner is used to combine the red and the alternating green or blue light. The recombined light is then directed to the PBS optics.

In the latest two above examples, one SLM is dedicated to one color while the second SLM alternates between the other two colors. The reflective color wheel in this case selects the color and also determines the duty cycle of the second SLM. The duty cycle is determined by controlling the relative areas of green and blue coatings as well as the dead-band area between the color regions. Although the red light is reflected first in the above description, the actual color assignment can be modified to reflect any one color (red or green or blue) from the other two, and allow the color wheel to alternate between the two transmitted colors.

Figure 17:
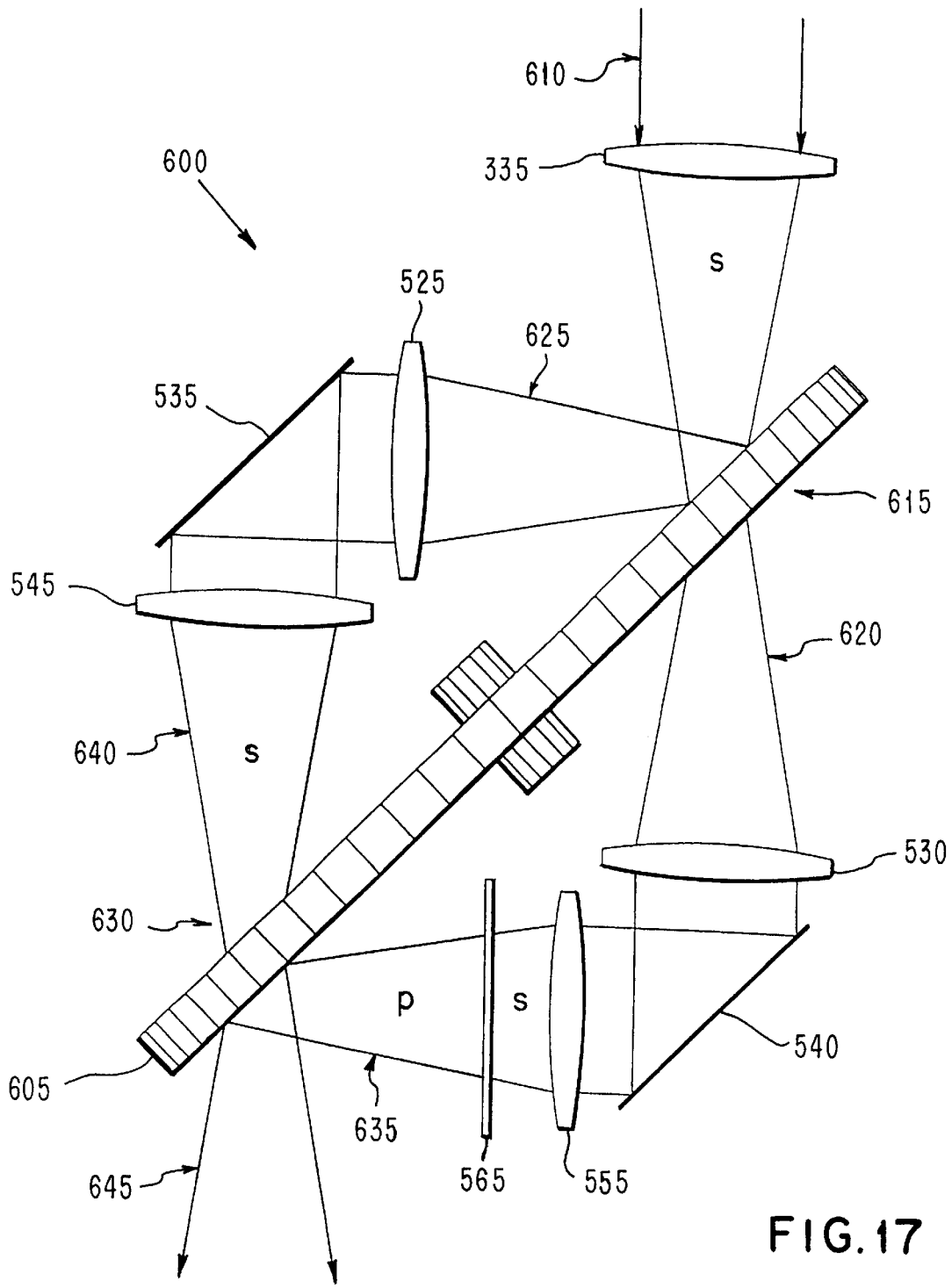
FIG. 17 shows another embodiment of a projection system using a single substrate color wheel according to the present invention.

FIG. 17 shows an alternative embodiment of an optical system 600 using a reflective color wheel 605 having a single substrate which includes a single set of filter coatings, instead of the two sets of coatings on the front and back substrates 205, 210 (FIGS. 13, 15), or the front reflective and rear absorptive filters 205, 210 of the embodiment shown in FIG. 16. In the optical system 600 shown in FIG. 17, the polarization-encoding of colors for the s-SLM and p-SLM is accomplished by passing the illumination beam through the single substrate wheel 605 twice.

As shown in FIG. 17, the condenser lens 335 images the plane of uniform s-polarized light 610, for example, onto a first illumination region 615 of the single substrate color wheel 605, which splits the light into transmitted 620 and reflected 625 colors. Each beam 620, 625 is then relayed by lenses to illuminate the wheel 605 again at a second illumination region 630 which is diametrically opposite the first illumination region 615.

Illustratively, two relay lenses 525, 545 and a mirror 535 direct the reflected light 625 from the first illumination region 615 to the second illumination region 630 of the wheel 605. Similarly, another two relay lenses 530, 555 and another mirror 540 direct the transmitted light 620 from the first illumination region 615 to the second illumination region 630 of the wheel 605.

Similar to the optical system 500 shown in FIG. 16, in the optical system 600 shown in FIG. 17, the half-wave retarder 565 is external to the single substrate wheel 605 and is perpendicular to the light beam. In particular, the half-wave retarder 565 is located between the relay lens 555 and the second illumination region 630, and converts the s-polarized light transmitted through the first illumination region 615 of the wheel 605 to p-polarized light 635 for illuminating the second illumination region 630. The other beam 640 illuminating the second illumination region 630 has s-polarization, which is the same polarization as the reflected light 625 from the first illumination region 615. The two p-polarized and s-polarized beams 635, 640 directed to the second illumination region 630 are recombined thereat. As described in connection with the previous embodiments, the output beam 645 from the second illumination region 630, which output beam 645 includes the two differently polarized beams 635, 640, is directed through a PBS to the p-SLM and s-SLM 155, 160 shown in the previous figures, such as FIGS. 15 and 16.

Figure 18:
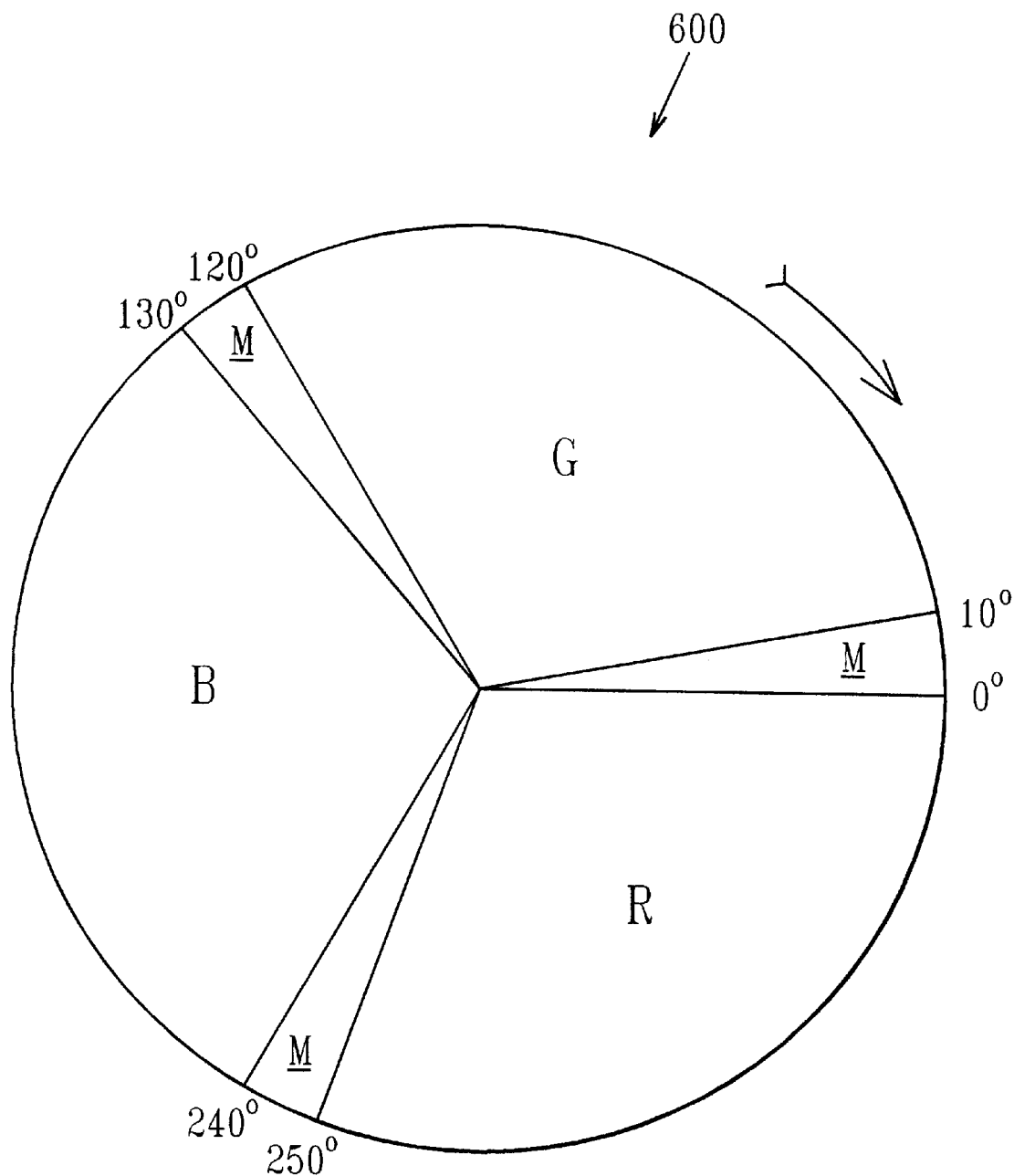
FIG. 18 shows a filter layout of the single substrate color wheel shown in FIG. 17 having mirrored sections to generate a desired color sequence according to the present invention.

FIG. 18 shows an illustrative filter layout to generate the desired color sequence in the optical system 600 of FIG. 17. However, it will be clear from the discussion below that other layouts are possible, for example, incorporating an increased number of filter segments. The letter labels R, G, B (for red, green and blue) on each filter indicate the color transmitted by the filter (rather than the reflected color as in FIGS. 4–10). Each filter reflects the two colors not transmitted. As shown in FIG. 18, a mirror coating M is provided between the three different filters R, G, B. The mirror coatings M reflect all colors and transmit none.

Referring to FIGS. 17 and 18, during times when both SLMs are active, the color filter at the first illuminated region 615 (FIG. 17) reflects two colors (e.g., R, G) and transmits the third color (e.g. B). The filter at the second illumination region 630 (FIG. 17) always reflects this third color (e.g. B) into the output beam 645, and also always transmits into the output beam one of the first two colors (e.g. R), while discarding the other one of the two colors (e.g. G) by sending this color (i.e. G) into a beam dump.

The sections with mirror coatings M cause the illumination at the SLMs to be briefly blanked out before a new color begins, thereby providing the dead or OFF time for the SLM to switch the displayed image.

The table below shows the sequence of colors that illuminate the two SLMs when the filter layout of the single substrate wheel 600 is that shown in FIG. 18, where the mirror coating are located between 0°–10°, 120°–130°, and 240°–250°; the green color transmitting filter is located between 10°–120°; the blue color transmitting filter is located between 130°–240°; and the red color transmitting filter is located between 250°–0°.

| | Position of First Illumination Region on Wheel | | | | | | | | | | | |
|---|---|---|---|---|---|---|---|---|---|---|---|---|
| | 0° to 10° | 10° to 60° | 60° to 70° | 70° to 120° | 120° to 130° | 130° to 180° | 180° to 190° | 190° to 240° | 240° to 250° | 250° to 300° | 300° to 310° | 310° to 0° |
| s-SLM | B | B | — | R | R | R | — | G | G | G | — | B |
| p-SLM | — | G | G | G | — | B | B | B | — | R | R | R |

The present invention describes optical configurations that allow simultaneous illumination of two SLMs, thus allowing both SLMs to operate at much greater than 50% duty cycle. This provides a substantial increase in efficiency. The high efficiency 2-SLM projector systems described above operate in the field-sequential color mode using polarization-based reflective or transmissive SLMs. The efficiency gain is a result of simultaneous illumination of both SLMs using two different colors.

Each SLM then cycles sequentially through the 3 colors, red (R), green (G) and blue (B). The ability to efficiently illuminate two SLMs at two different colors, as well as maintain the sequential color illumination, is facilitated by the use of a reflective color wheel. The reflective color wheel can select any two colors simultaneously, and in one embodiment, includes two substrates or surfaces. Both surfaces of the color wheel have a reflective coating, with the front surface selecting the first color and the rear surface selecting the second color. Furthermore, the color wheel assigns orthogonal polarization states for the two selected colors. A polarization-controlling prism assembly is used to selectively direct the polarized illumination to the proper SLM and also to recombine the image forming light from the two SLMs.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. A display comprising:
    a light source for providing a polarized light having a first polarization;
    a wheel having front and back surfaces displaced from each other, said front and back surfaces each having segments of different colors for separating the polarized light into a plurality of colors;
    a retardation film for converting a polarization of colors reflected from said back surface from said first polarization to a second polarization;
    a first light valve for receiving colors having said first polarization;
    a second light valve for receiving colors having said second polarization; said first and second light valves providing an image forming light; and
    a projection lens for projecting the image forming light onto a screen.

2. The display of claim 1, wherein said segments of said front surface are separated by front off regions and said segments of said back surface are separated by back off regions, said front and back off regions being offset from each other and preventing illumination of said first and second light valve.

3. The display of claim 1, wherein said segments of said front and back surfaces are separated by off regions which prevent illumination of said first and second light valve.

4. The display of claim 2, wherein said off regions are transparent regions.

5. The display of claim 1, wherein said segments of said front surface are offset relative to said segments of said back surface to form combined segments, wherein every other ones of said combined segments includes dual color bands to simultaneously provide first and second colors having said first and second polarizations, respectively, for simultaneously illuminating said first light valve with said first color having said first polarization and said second light valve with said second color having said second polarization.

6. The display of claim 1, wherein said segments of said front and back surfaces simultaneously reflect the plurality of colors toward said first and second light valves.

7. The display of claim 1, wherein said segments of said front and back surfaces are offset relative each other to provide dual bands having two colors separated by single bands having a single color, wherein each of said single bands has a different combination of color and polarization.

8. The display of claim 1, wherein said segments of said front and back surfaces are offset from each other so that one colored beam having one of said first and second polarizations is provided to one of said first and second light valves while the other of said first and second light valves is not illuminated, wherein a duty cycle of each of said first and second light valves is greater than 50%.

9. The display of claim 1, wherein said segments have reflective dichroic coatings.

10. The display of claim 1, further comprising at least one relay lens located between said wheel and said first light valve.

11. The display of claim 1, wherein a duty cycle of each of said first and second light valves is greater than 50%.

12. The display of claim 1, further comprising a device to rotate said wheel for sequentially illuminating said first and second light valves simultaneously with different colors and different polarizations.

13. The display of claim 1, further comprising a polarizing beam splitter assembly for directing the plurality of colors to said first and second light valves and directing the image forming light to said projection lens.

14. The display of claim 13, wherein said polarizing beam splitter assembly includes a clean-up polarizer located between two halves of said polarizing beam splitter assembly for absorbing one of said first and second polarizations.

15. The display of claim 13, wherein said polarizing beam splitter assembly includes a plurality of polarizing beam splitter sub-assemblies.

16. The display of claim 13, wherein said polarizing beam splitter assembly includes a first half sub-assembly and a second half sub-assembly, said first light valve being located at one side of said first half sub-assembly and said second light valve being located at an opposite side of said second half sub-assembly.

17. The display of claim 13, wherein said polarizing beam splitter assembly reflects light having the first polarization and transmits light having the second polarization.

18. The display of claim 1, wherein said first and second light valves are one of transmissive and reflective light valves.

19. The display of claim 1, wherein said retardation film is located between said front and back surfaces of said wheel.

20. The display of claim 1, wherein said retardation film is located between front and back surfaces of said wheel and attached to said front and back surfaces.

21. A display comprising:
    a light source for providing a polarized light having a first polarization;
    a wheel which separates the polarized light into a plurality of colors, reflects a first colored light and transmits a second colored light;
    a retardation film for converting a polarization of said second colored light from said first polarization to a second polarization;
    a first light valve for receiving said first colored light having said first polarization;
    a second light valve for receiving said second colored light having said second polarization; said first and second light valves providing first and second image forming lights; and
    a projection lens for projecting the first and second image forming lights onto a screen.

22. The display of claim 21, wherein said wheel has front and back surfaces each having segments of different colors for simultaneously providing said first and second colored lights to said first and second light valves, respectively.

23. The display of claim 21, wherein said wheel includes a front surface having a single color filter and a back surface having a dual color filter.

24. The display of claim 21, wherein said wheel includes a front surface having a first tri-color filter and a back surface having a second tri-color filter, said first and second tri-color filters being offset relative each other.

25. The display of claim 21, further comprising a first mirror located between said wheel and said first light valve for folding a first path of said first colored light from said wheel to said first light valve, and a second mirror located between said wheel and said retardation film for folding a second path of said second colored light from said wheel to said second light valve.

26. The display of claim 21, further comprising a device to rotate said wheel for sequentially illuminating said first and second light valves simultaneously with different colors and different polarizations.

27. The display of claim 21, further comprising a polarizing beam splitter assembly for directing the plurality of colors to said first and second light valves, combining the first and second image forming lights into a composite image forming light, and directing the composite image forming light to said projection lens.

28. The display of claim 27, wherein said polarizing beam splitter assembly includes a clean-up polarizer for absorbing one of said first and second polarizations located between two halves of said polarizing beam splitter assembly.

29. The display of claim 21, further comprising a polarizing beam splitter assembly having first, second and third polarizing beam splitter sub-assemblies, said first polarizing beam splitter sub-assembly directing said first colored light to said first light valve, said second polarizing beam splitter sub-assembly directing said second colored light to said second light valve, and said third polarizing beam splitter sub-assembly combining the first and second image forming lights into a composite image forming light and directing the composite image forming light to said projection lens.

30. The display of claim 21, wherein said wheel has a plurality of segments each transmitting a different color light, said plurality of segments being separated from each other by a reflective region.

31. The display of claim 21, further comprising a first relay lens for directing the first colored light reflected from a first illumination region of said wheel which receives said polarized white light to a second illumination region of said wheel; and a second relay lens for directing the second colored light transmitted from the first illumination region to the second illumination regions of said wheel.

32. The display of claim 21, wherein said first light valve provides a right eye image and said second light valve provides a left eye image for providing a three dimensional image.

33. A color wheel for field-sequential color projection comprising:

a first surface having first color segments which convert a polarized white light having a first polarization to different colors;

a second surface having second color segments which convert said polarized white light to said different colors; and a retardation film for converting a polarization of colors reflected from said second surface from said first polarization to a second polarization;

said first color segments being offset from said second color segments to provide alternating dual color and single color bands, said dual color bands including a first colored light having the first polarization and a second colored light having the second polarization.

34. The color wheel of claim 33, wherein said first and second color segments include reflective coatings to illuminate a light valve.

35. The color wheel of claim 33, wherein said first and second color segments include regions to prevent illumination of a light valve.

36. A color wheel for a field-sequential color projector comprising a surface having color segments which convert polarized white light to different colors for illuminating a light valve, said color segments being separated by one of reflective and transmissive regions to prevent illumination of said light valve, and said segments providing dual bands having two colors separated by single bands having a single color, wherein each of said single bands has a different combination of color and polarization.

* * * * *